Patented Nov. 5, 1946

2,410,605

UNITED STATES PATENT OFFICE 2,410,605

INTERPOLYMERS OF ISOBUTYLENE WITH AN ALKYL ACETYLENE AND THEIR PREPARATION

Denis William Huebner and James Edgar Fearey, Norton-on-Tees, England, assignors to Imperial Chemical Industries Limited, a corporation of Great Britain No Drawing. Application May 18, 1943, Serial No. 487,537. In Great Britain May 18, 1942

6 Claims. (Cl. 260—92)

It is already known that isobutylene and other iso-olefines can be polymerised to form products of high molecular weight, by subjecting them at temperatures below about −10° C., to the action of inorganic halides such as boron fluoride and aluminium chloride.

We have now found that interpolymers of iso-olefines such as isobutylene with alkyl acetylenes, can be produced by subjecting a mixture containing an iso-olefine and one or more alkyl acetylenes to the action of a catalyst of the Friedel-Crafts type, at a temperature below −10° C.

Operating conditions similar to those known for the polymerisation of iso-olefines may be employed. The molecular weights of the interpolymers vary with the reaction conditions such as temperature, presence or absence of solvent, amount and nature of the catalyst, in a manner similar to that already known for the polymerization of iso-olefins per se. In addition the molecular weight and yield have been found to fall as the proportion of the iso-olefine in the interpolymer decreases, other operating conditions being the same.

Example

A mixture consisting of 2 parts by volume of liquid methyl acetylene, 18 parts isobutene, 60 parts pure petroleum ether, was placed in a stirred glass vessel cooled to about −80° C., in a bath of methanol and solid carbon dioxide. A quantity of powdered solid carbon dioxide was then added to the reaction mixture which was stirred vigorously. Sufficient solid carbon dioxide was added so that a slight excess remained after the polymerisation. 100 parts by volume of gaseous boron trifluoride were then rapidly passed through the mixture whereupon vigorous polymerisation took place, most of the solid carbon dioxide being vaporised by the heat of the reaction.

Throughout the reaction, the temperature remained at −82° C. After polymerisation, an excess of methyl alcohol was added to the product, whereupon the polymer formed in the reaction was precipitated as a sticky semi-solid. This was further washed with methanol and then dried in an oven at about 100° C. The product was a somewhat tacky, rubber-like solid which resembled polyisobutene of low molecular weight. The molecular weight as determined by the Staudinger viscosity method was 3,000 and the iodine value was 46.5 gms. iodine/100 gms. which corresponds to 7.3% methyl acetylene in the interpolymer.

We claim:

1. A process for the production of an interpolymer of isobutylene and methyl acetylene which comprises subjecting a mixture containing isobutylene and methyl acetylene to the action of boron trifluoride at a temperature below −10° C.

2. A process for the production of an interpolymer of isobutylene and methyl acetylene which comprises subjecting a mixture containing isobutylene and methyl acetylene to the action of aluminium chloride at a temperature below −10° C.

3. A process for the production of an interpolymer of isobutylene and methyl acetylene which comprises subjecting a mixture containing isobutylene and methyl acetylene to the action of a Friedel-Crafts catalyst at a temperature below −10° C.

4. A process for the production of an interpolymer of isobutylene and methyl acetylene which comprises subjecting a mixture containing isobutylene and methyl acetylene to the action of a Friedel-Crafts catalyst at a temperature not exceeding −80° C.

5. The process according to claim 4 wherein the Friedel-Crafts catalyst is boron trifluoride.

6. An interpolymer of isobutylene and methyl acetylene.

DENIS WILLIAM HUEBNER.
JAMES EDGAR FEAREY.